(12) United States Patent
Liang et al.

(10) Patent No.: US 7,031,860 B2
(45) Date of Patent: Apr. 18, 2006

(54) METHOD AND SYSTEM OF SEMICONDUCTOR FABRICATION FAULT ANALYSIS

(75) Inventors: Shih-Tsung Liang, Hsinchu (TW); Hsin-Chih Tai, Kaohsiung (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 9 days.

(21) Appl. No.: 10/947,090

(22) Filed: Sep. 22, 2004

(65) Prior Publication Data

US 2006/0064271 A1    Mar. 23, 2006

(51) Int. Cl.
*G01N 37/00*    (2006.01)
*G06F 19/00*    (2006.01)

(52) U.S. Cl. ........................................................ 702/84
(58) Field of Classification Search ................ 702/121
See application file for complete search history.

(56) References Cited

U.S. PATENT DOCUMENTS

| 6,421,574 B1* | 7/2002 | Steffan et al. ............... 700/121 |
| 6,610,550 B1* | 8/2003 | Pasadyn et al. ................ 438/14 |
| 2002/0161532 A1* | 10/2002 | Dor et al. ..................... 702/35 |

* cited by examiner

*Primary Examiner*—John Barlow
*Assistant Examiner*—Demetrius Pretlow
(74) *Attorney, Agent, or Firm*—Thomas, Kayden, Horstemeyer & Risley (57) ABSTRACT

A system and method for semiconductor fabrication fault analysis. The storage device stores test records. The program module receives a study lot identity, acquires suspect fabrication issues corresponding to the study lot identity, acquires a number of comparative wafer lot identities processed by the same fabrication tool and fabrication recipe for each fabrication issue, defines the comparative wafer lot identities having the same failed cluster groups as similar failed lot identities, calculates a similarity score for each similar failed lot identity, calculates a causal score according to the similarity scores for each suspect fabrication issue, and arranges the suspect fabrication issues according to causal scores thereof.

35 Claims, 12 Drawing Sheets

FIG. 1

| Group (211) | WAT Parameter (212) | VTN2 AWEIM2 (213a) | NWL1 APHNWX (213b) | NWL1 AIMNW1 (213c) | PAPT1 AIMVP1 (213d) |
|---|---|---|---|---|---|
| A | BV_N4 | 0 | 0 | 0 | 0 | 221
| A | Isat_N4 | 0 | 0 | 0 | 0 | 222
| A | VT_N4 | 0 | 0 | 0 | 0 | 223
| B | BV_P4 | 0 | 2 | 3 | 5 | 224
| B | Isat_P4 | 0 | 2 | 4 | 5 | 225
| E | Isat_P43 | 0 | 0 | 0 | 0 | 226
| E | VT_P42 | 0 | 0 | 0 | 0 | 227
| E | VT_P43 | 0 | 0 | 0 | 0 | 228

FIG. 2

| Stage | Tool | Previous lot ID(3) | Previous lot ID(2) | Previous lot ID(1) | Subsequent lot ID(1) | Subsequent lot ID(2) | Subsequent lot ID(3) |
|---|---|---|---|---|---|---|---|
| P01_ET | ADUET | G35079.1 | G35083.1 | G35037.1 | G35135.1 | G35075.1 | G35071.1 |
| P01_ET | APOLL3 | G35173.1 | G35080.1 | G35118.1 | G35079.1 | G35135.1 | G35138.1 |
| P01_PH | APH7G3 | G35113.1 | G35117.1 | G35118.1 | G35135.1 | G35079.1 | G35116.1 |
| P-LDD1_M | BHI01 | G33585.1 | G33594.1 | G93125.1 | G36135.1 | G35087.1 | G34791.1 |
| P-LDD1_M | AMED04 | G61840.1 | G35118.1 | G35135.1 | G61859.1 | G34902.3 | N/A |
| RP01_DP | ASTD02 | G34455.1 | G35037.1 | G34815.1 | G34815.1 | G35818.1 | G35045.1 |

FIG. 3a

| Stage | Tool | Previous lot ID(3) | Previous lot ID(2) | Previous lot ID(1) | Subsequent lot ID(1) | Subsequent lot ID(2) | Subsequent lot ID(3) |
|---|---|---|---|---|---|---|---|
| P01_ET | ADUET | G35079.1 | G35083.1 | G35037.1 | G35135.1 | G35075.1 | G35071.1 |
| P01_ET | APOLL3 | G35173.1 | G35080.1 | G35118.1 | G35079.1 | G35135.1 | G35138.1 |
| P01_PH | APH7G3 | G35113.1 | G35117.1 | G35118.1 | G35135.1 | G35079.1 | G35116.1 |
| P-LDD1_M | BHI01 | G33585.1 | G33594.1 | G93125.1 | G36135.1 | G35087.1 | G34791.1 |
| P-LDD1_M | AMED04 | G61840.1 | G35118.1 | G35135.1 | G61859.1 | G34902.3 | N/A |
| RP01_DP | ASTD02 | G34455.1 | G35037.1 | G34815.1 | G34815.1 | G35818.1 | G35045.1 |

FIG. 3b

| Stage | Tool | Previous lot ID(3) | Previous lot ID(2) |
|---|---|---|---|
| P01_ET | ADUET | G35079.1 | G35083.1 |
| P01_ET | APOLL3 | G35173.1 | G35080.1 |
| P01_PH | APH7G3 | G35113.1 | G35117.1 |
| P-LDD1_M | BHI01 | G33585.1(4) | G33594.1 |
| P-LDD1_M | AMED04 | G61840.1 | G35118.1 |
| RP01_DP | ASTD02 | G34455.1 | G35037.1 |
| Weighted value | | 1 | 2 |

| | 35 | 36 | 37 | 38 |
|---|---|---|---|---|
| | Previous lot ID(1) | Subsequent lot ID(1) | Subsequent lot ID(2) | Subsequent lot ID(3) |
| 311 | G35037.1 | G35135.1(4.5) | G35075.1 | G35071.1 |
| 312 | G35118.1 | G35079.1 | G35135.1(4.5) | G35138.1 |
| 313 | G35118.1 | G35135.1(4.5) | G35079.1 | G35116.1 |
| 314 | G93125.1(4.5) | G36135.1(3) | G35087.1 | G34791.1 |
| 315 | G35135.1(4.5) | G61859.1 | G34902.3 | N/A |
| 316 | G34815.1 | G34815.1 | G35818.1 | G35045.1(2) |
| | 3 | 3 | 2 | 1 |

FIG. 3c-2

| Stage | Tool | Previous lot ID(3) | Previous lot ID(2) |
|---|---|---|---|
| P01_ET | ADUET | G33585.1(4) | G33594.1 |
| P01_ET | APOLL3 | G35079.1 | G35083.1 |
| P01_PH | APH7G3 | G61840.1 | G35118.1 |
| P-LDD1_M | BHI01 | G35113.1 | G35117.1 |
| P-LDD1_M | AMED04 | G35173.1 | G35080.1 |
| RP01_DP | ASTD02 | G34455.1 | G35037.1 |

|  | Previous lot ID(1) 35 | Subsequent lot ID(1) 36 | Subsequent lot ID(2) 37 | Subsequent lot ID(3) 38 |
|---|---|---|---|---|
| 314 | G93125.1(4.5) | G36135.1(3) | G35087.1 | G34791.1 |
| 311 | G35087.1 | G35135.1(4.5) | G35075.1 | G35071.1 |
| 315 | G35135.1(4.5) | G61859.1 | G34902.3 | N/A |
| 313 | G35118.1 | G35135.1(4.5) | G35079.1 | G35116.1 |
| 312 | G35118.1 | G35079.1 | G35135.1(4.5) | G35138.1 |
| 316 | G34815.1 | G34815.1 | G35818.1 | G35045.1(2) |

METHOD AND SYSTEM OF SEMICONDUCTOR FABRICATION FAULT ANALYSIS

BACKGROUND

The present invention relates to fabrication process monitoring techniques, and more particularly, to a method and system of semiconductor fabrication fault analysis.

A conventional semiconductor factory typically includes the requisite fabrication tools to process semiconductor wafers for a particular purpose, such as photolithography, chemical-mechanical polishing, or chemical vapor deposition. During manufacturing, the semiconductor wafer passes through a series of process steps, performed by various fabrication tools. For example, in the production of an integrated semiconductor product, the semiconductor wafer passes through up to 600 process steps. The costs for automated production are influenced to a great extent by how well and efficiently the manufacturing process can be monitored or controlled, so that the ratio of defect-free products to the overall number of products manufactured (i.e., yield ratio) achieves as great a value as possible. Unfortunately, the individual process steps are subject to fluctuations and irregularities, which in the worst case may mean, for example, the defect of a number of chips or the entire wafer. Therefore, each individual process step must be carried out as stably as possible in order to ensure an acceptable yield after processing of a wafer is completed.

Integrated circuits are typically fabricated by processing one or more wafers as a "lot" with a series of wafer fabrication tools (i.e., "processing tools"). During integrated circuit fabrication, various test structures are fabricated on a wafer to extract information on the process and device performance for fault analysis. Wafer acceptance test (WAT) data is generated by electrical measurements of these test structures after completing the entire fabrication process. Several sites located on the fixed locations on each wafer are selected, from which over 100 WAT parameters are measured. Statistical analysis and process diagnosis based on end-of-line WAT data provide an assessment of overall process performance and its impact on product yield. In order to ensure acceptable yield, the historical WAT data is often examined to discover critical fabrication issues that cause serious defects or errors.

Since WAT measurements reflect the overall results of the entire fabrication process, their statistical characteristics are usually complicated. Conventionally, several statistical methods, such as Analysis of Variance (ANOVA), Nonparameteric Statistics, box plots or trend charts, have been employed for fault analysis of WAT data. A box plot is used to determine if any of the individual tools, recipes or operations, lie outside an acceptable range of variation. A trend chart is useful for WAT data comparison and drift analysis of fabrication tools. ANOVA and Nonparameteric Statistical methods are employed to detect commonality factors (e.g., tools, recipes or operations) and the impact thereof on faulty wafer lots. Although the described methods are feasible, several problems remain. Box plots and trend charts are incapable of detecting common factors because the calculation thereof is limited to a single fabrication tool, recipe or operation. The ANOVA and Nonparameteric Statistics often discover incorrect common factors because the size of WAT sample data is often lower than their requirement (ANOVA and Nonparameteric Statistics require at least 30 and 5 samples respectively). Additionally, conventional methods of fabrication fault analysis separately calculate each WAT parameter without considering such important factors as the common features among WAT parameters, thereby generating erroneous results for critical fabrication issues.

In view of these limitations, a need exists for a system and method for semiconductor manufacturing fault analysis with the increased accuracy.

SUMMARY

It is therefore an object of the present invention to provide a system and method for semiconductor fabrication fault analysis with increased accuracy.

According to an embodiment of the invention, the system comprises a processing unit, a memory, a storage device, an input device and a display device.

The storage device stores multiple Quality Function Deployment (QFD) records, lot processing records and test records. The QFD records store multiple test parameters, and several test parameters are grouped into a cluster group. Each test parameter relates to multiple fabrication issues, such as fabrication tools, recipes, operations, or others, and has multiple correlation values individually indicating coefficient extent between the test parameter and the particular fabrication issue. Each cluster group contains several test parameters based on common test features for several device types, such as NMOS devices, PMOS devices, FOX devices, or others. The correlation value preferably ranges from 0 to 5, in which 0 means no relationship exists between a test parameter and a fabrication issue. Each lot processing record corresponds to one wafer lot and stores fabrication information regarding whether the wafer lot has been processed by a fabrication tool according to a particular recipe and preferably includes a lot identity, a fabrication start time, a fabrication end time, a fabrication tool identity, a recipe identity and an operation identity. Each test record, which corresponds to one wafer lot, stores test information comprising a measurement value for one test parameter after completion of the entire fabrication process.

The memory preferably includes a program module which contains routines, programs, objects, components, and the like, for performing fabrication fault analysis.

According to some embodiments of the present invention, the program module receives a wafer lot identity as a study lot identity. The study lot identity corresponds to a wafer lot which may have one or more test parameter faults. The program module acquires at least one failed test parameter corresponding to the study lot identity by querying the test records, and subsequently acquires fabrication tools corresponding to the queried test parameter(s) as suspect fabrication issues by querying the QFD records. For each fabrication tool, a number of wafer lot identities prior or next to the study lot identity, which have been processed according to the same fabrication recipe as the study lot identity, are selected as comparative lot identities by detecting the fabrication start time in the lot processing records. The program module sequentially scans comparative lot identities to detect which one has the same failed cluster groups as the study lot identity by querying the test records and QFD records. The comparative lot identities having the same failed pattern are referred to as similar failed lot identities.

The program module acquires multiple failed parameter identities by querying the test records for a given similar failed lot identity, and subsequently acquires correlation values as parameter similarity values (PSVs) by querying the QFD records for the given failed parameter identities and the detected fabrication tool identity. A similarity score is calculated according to the PSVs to represent the extent of similarity between test fault patterns, for a study lot identity and a similar failed lot identity.

In order to consider time lengths between similar lot identities and the study lot identity, multiple weighted values are predefined. For each fabrication issue, multiple adjacent similar failed wafer lots including the study lot are referred to as a continuity fault pattern. A causal score (CS) is calculated to reflect the causal relationship between the fabrication issue and the study lot, and a stronger relationship has a higher value than a weaker relationship.

The program module finally arranges the fabrication issues in descending order according to their CS values. The ordered fabrication issues are displayed on a display device or stored in the storage device.

BRIEF DESCRIPTION OF THE DRAWINGS

The aforementioned objects, features and advantages of this invention will become apparent by referring to the following detailed description of the preferred embodiment with reference to the accompanying drawings, wherein:

FIGS. 3a, 3b, 3c-1, 3c-2, 3d-1 and 3d-2 illustrate an exemplary comparative wafer lot identity list in various aspects according to the preferred embodiment of the present invention;

DESCRIPTION

Figure 1:
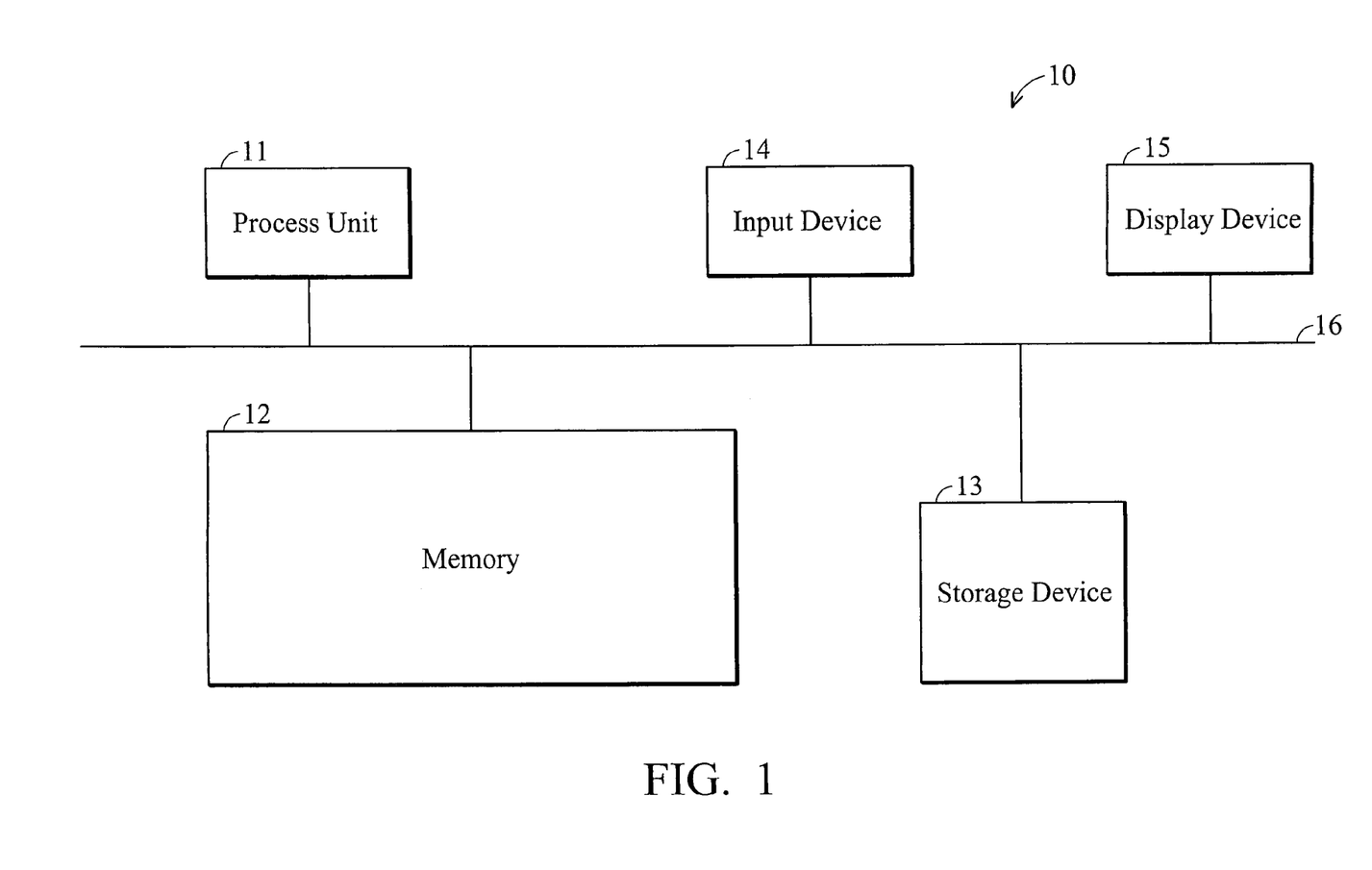
FIG. 1 is a diagram of the architecture of the system for semiconductor fabrication fault analysis according to an embodiment of the present invention.

FIG. 1 is a diagram of the architecture of the system for semiconductor fabrication fault analysis. As shown in FIG. 1, the system 10 includes a processing unit 11, a memory 12, a storage device 13, an input device 14 and a display device 15. The processing unit 11 is connected by buses 16 to the memory 12, storage device 13, input device 14 and display device 15 based on Von Neumann architecture. The processing unit 11, memory 12, storage device 13, display device 14 and input device 15 may be conventionally incorporated in a mainframe computer, a mini-computer, a workstation computer, a personal computer, or a mobile computer.

The processing unit 11, directed by instructions received from the memory 12 and an operator through the input device 14, executes fabrication fault analysis. There may be only one or there may be more than one processing unit 11, such that the processor of computer 10 comprises a single central processing unit (CPU), or multiple processing units, commonly referred to as a parallel processing environment.

Figure 2:
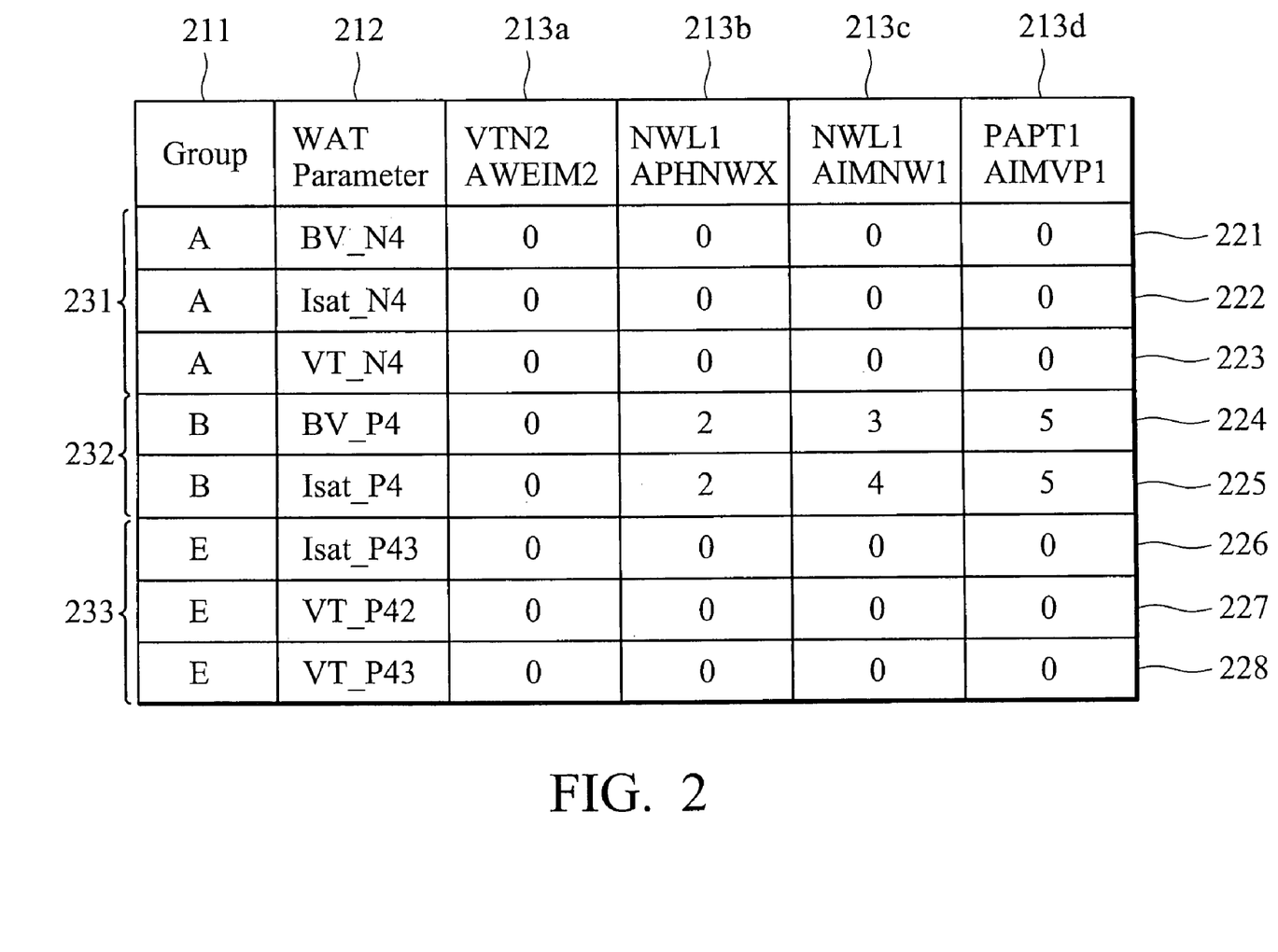
FIG. 2 illustrates several exemplary QFD records.

The storage device 13 may comprise a hard drive, an optical drive, a portable drive, or others, for accessing multiple Quality Function Deployment (QFD) records, lot processing records and Wafer Acceptance Test (WAT) records. The QFD, lot processing and WAT records may be implemented in a database system, digital files or the combination. The QFD records store multiple WAT parameters, and several WAT parameters are grouped into a cluster group. Each WAT parameter relates to multiple fabrication issues, such as fabrication tools, recipes, operations, or others, and has multiple correlation values individually indicating coefficient extent between the WAT parameter and the particular fabrication issue. Each cluster group contains several WAT parameters based on common test features for several device types, such as NMOS device, PMOS device, FOX device, or others. The correlation value preferably ranges from 0 to 5, in which 0 means no relationship exists between a WAT parameter and a fabrication issue. A higher correlation value indicates that the fabrication issue stronger affects the WAT parameter. FIG. 2 illustrates several exemplary QFD records according the present invention. Three cluster groups, such as "A" 231, "B" 232 and "C" 233, individually comprises two to three WAT parameters, and each WAT parameter comprises multiple correlation values with particular tools, such as "VTN2 AWEIM2" 231a, "NWL1 APHNWX" 231b, "NWL1 AIMNW1" 231c and "PAPT1 AIMVP1" 231d. Referring to record 211, a WAT parameter "BV_N4" has no relationship with tools 213a to 213d. Conversely, record 224 indicates that tools 213b to 213d may cause outliers of a WAT parameter "BV_P4". Each lot processing record corresponds to one wafer lot and stores fabrication information regarding whether the wafer lot has been processed by a fabrication tool according to a particular recipe and preferably includes a lot identity, a fabrication start time, a fabrication end time, a fabrication tool identity, a recipe identity and an operation identity. Each WAT record corresponding to one wafer lot stores test information comprising a measurement value for one WAT parameter after completing the entire fabrication process. The implementation of the QFD, lot processing and WAT records described above is not limited to a single table/file, but also to multiple related tables/files or possibly a combination of tables and files. Those having skill in the art will appreciate that additional or different fields may be provided.

The memory 12 is preferably a random access memory (RAM) but may also include read-only memory (ROM) or flash ROM. The memory 12 preferably includes a program module which includes routines, programs, objects, components, or others, for performing fabrication fault analysis.

Figure 4A:
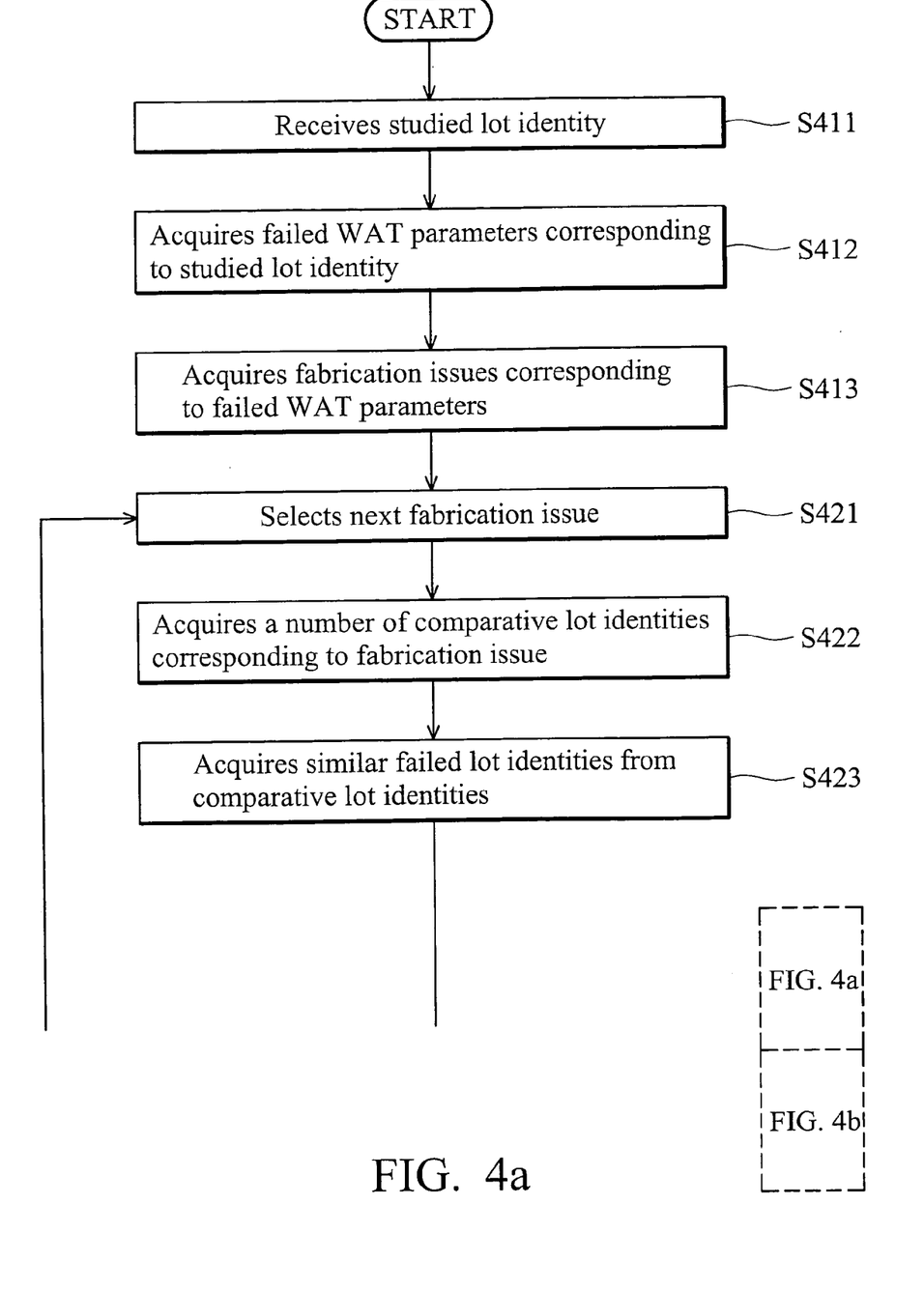
FIGS. 4a and 4b are flowcharts of the method for semiconductor fabrication fault analysis.
Figure 4B:
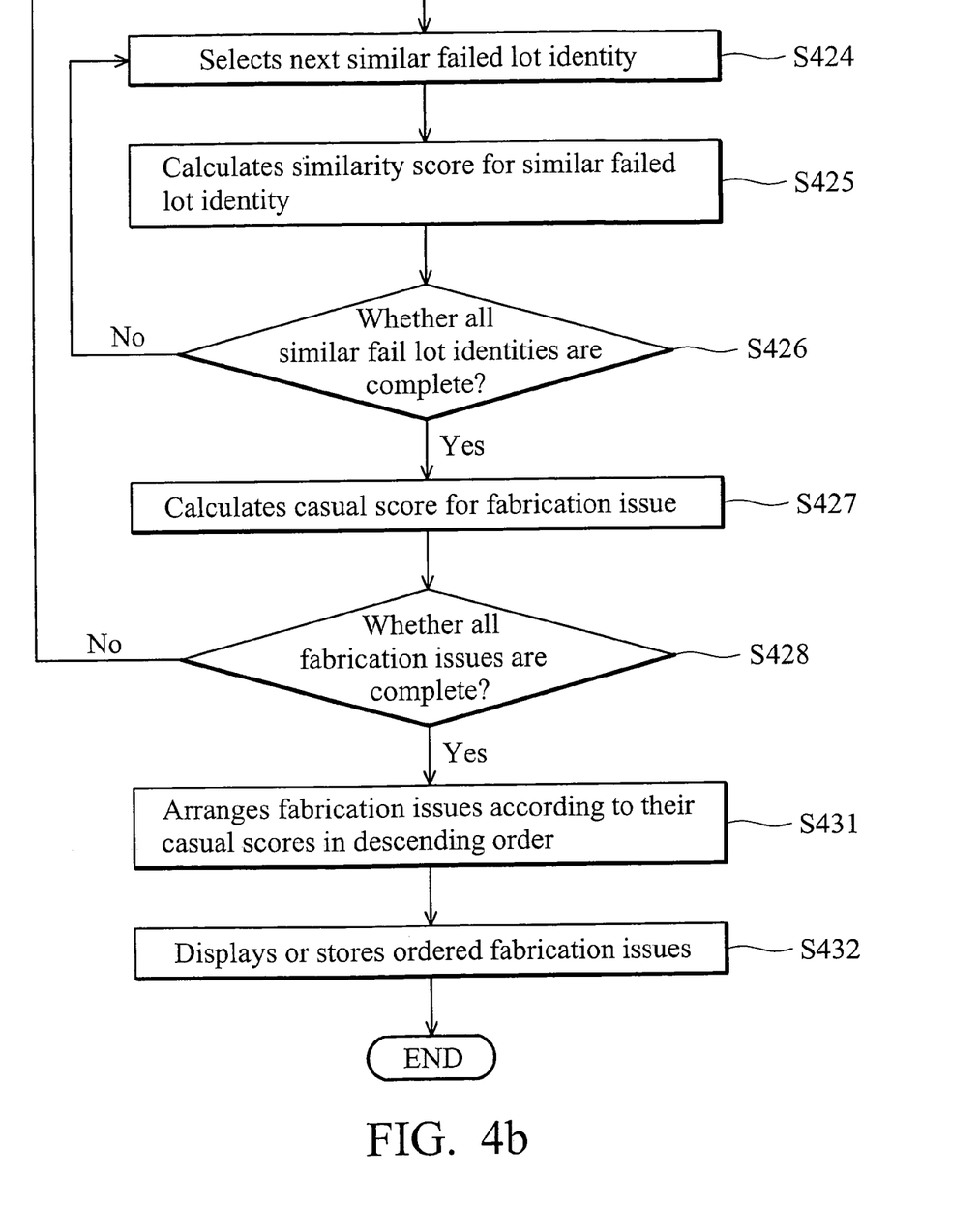

FIGS. 4a and 4b are flowcharts of the method for semiconductor fabrication fault analysis according to an embodiment of the present invention. Accordingly, the program module executes the method of semiconductor fabrication fault analysis as follows.

The method begins in step S411 by receiving a wafer lot identity as a study lot identity. The study lot identity corresponds to a wafer lot which may have one or more WAT parameter faults. The study lot identity may be received from a user, a software application resident in the same system 10 or another remote computer system via a network, such as a LAN, a WAN, an intranet, an extranet or the Internet.

In step S412, at least one failed WAT parameter, which corresponds to the study lot identity, is acquired by querying the WAT records.

Figure 3A:
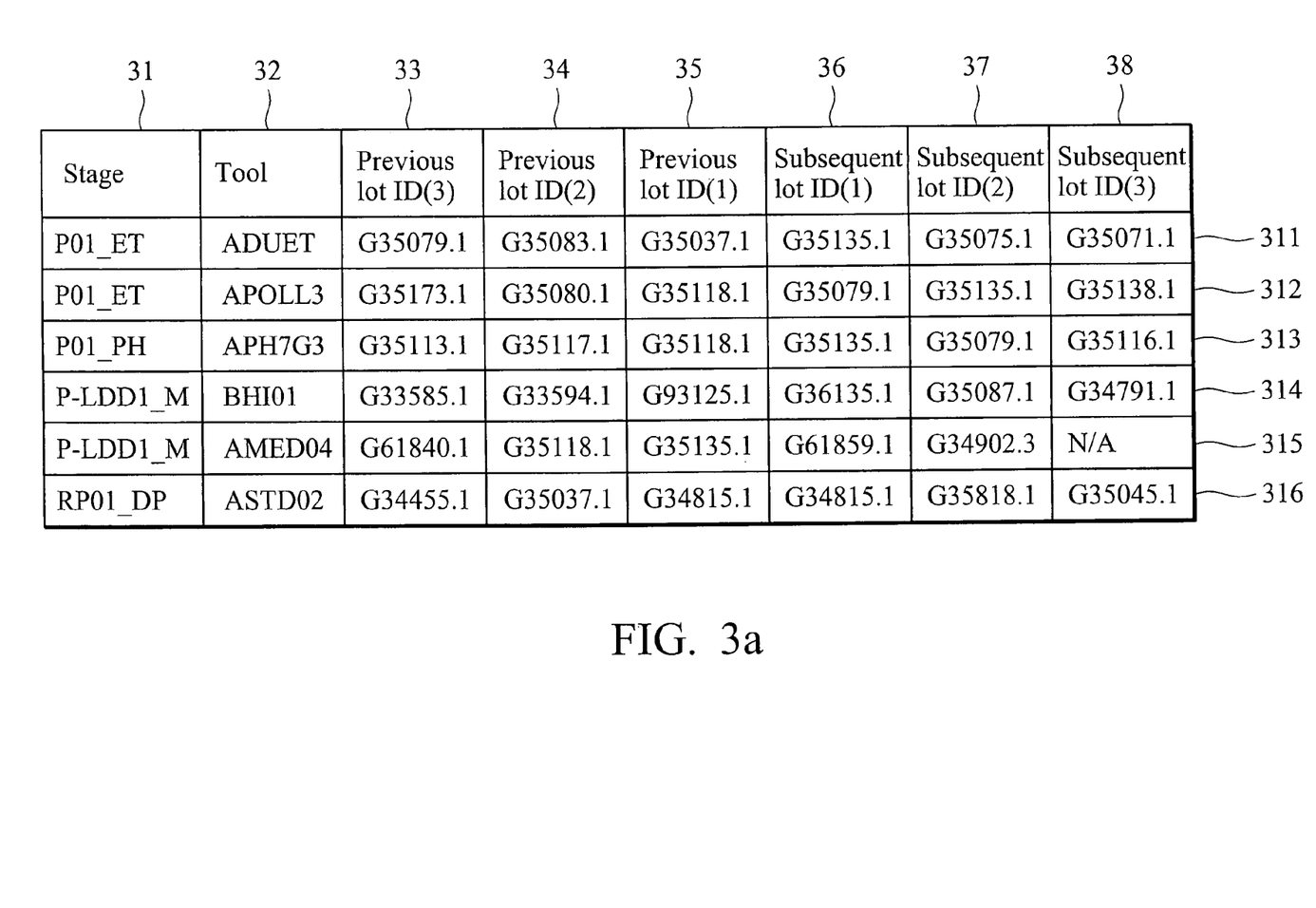

In step S413, suspect fabrication tools, which correspond to the queried WAT parameter(s), are acquired as suspect issues by querying the QFD records. It is noted that suspect fabrication issues are not limited to fabrication tools, but can also be fabrication recipes, operations or others. FIGS. 3a, 3b, 3c-1, 3c-2, 3d-1 and 3d-2 illustrate an exemplary comparative wafer lot identity list in various aspects according to the preferred embodiment of the present invention. Referring to FIG. 3a, as shown in column 32, six fabrication tools, such as "ADUET", "APOLL3", "APH7G3", "BHI01", "AMED04" and "ASTD02", which may be the cause of one or more WAT faults in the study lot, are acquired.

Next, double loops, such as an inner loop (steps S424 to S426) and an outer loop (steps S421 to S428), are used to calculate a causality score for each fabrication issue to represent the causal extent of the failed study lot identity. The inner loop is responsible for calculating one similar score for one similar failed lot identity corresponding to a fabrication issue, and the outer loop is responsible for calculating the causal score according to the similar score(s) for the particular fabrication issue.

The process proceeds to step S421 to select a next fabrication issue as a start point of the outer loop. In step S422, a number of wafer lot identities prior or next to the study lot identity, which have been processed by the same tool according to the same fabrication recipe as the study lot identity, are selected as comparative lot identities by detecting the fabrication start time in the lot processing records. Preferably, the number of previous and subsequent wafer lot identities is set to three or greater. Referring to FIG. 3a, three previous lot identities are shown in columns 33 to 35 and three subsequent lot identities are shown in columns 36 to 39 for each suspect tool.

Figure 3B:
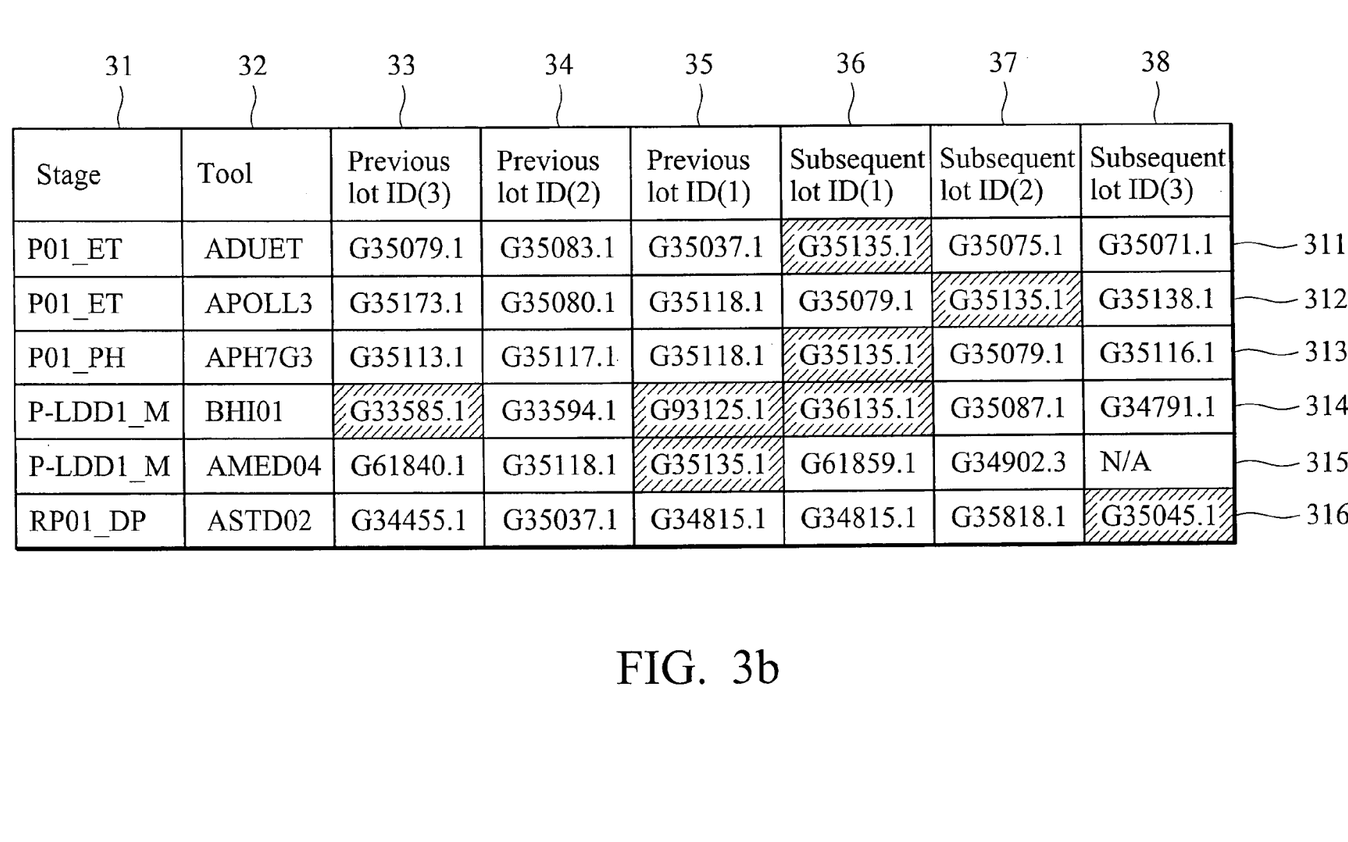

In step S423, similar failed lot identities which have the same failed cluster groups as the study lot identity are identified from the comparative lot identities by querying the WAT records and QFD records. Referring to FIG. 3b, the similar failed lot identities are shown in the shadowed fields.

The process proceeds to step S424 to select a next similar failed lot identity as a start point of the inner loop. In step S425, a similarity score (SS) is calculated to represent the extent of similarity between WAT fault patterns, for the study lot identity and a selected similar failed lot identity. First, multiple failed parameter identities are acquired by querying the WAT records for given a similar failed lot identity, and subsequently correlation values therewith are acquired as parameter similarity values (PSVs) by querying the QFD records for the given failed parameter identities and the detected fabrication tool identity. A similarity score is calculated according to the PSVs to represent the extent of similarity between WAT fault patterns, for a study lot identity and a similar failed lot identity. In this example, equation (1) shows the formula for calculating a similarity score (SS) if a similar failed lot identity having failed WAT parameters completely different from those found in the study lot. Equation (2) shows the formula for calculating a SS if a similar failed lot identity having any failed WAT parameters the same as those found in the study lot.

Equation (1):

$$SS = \frac{\sum_{i=1}^{n} PSVi}{n},$$

where PSVi represents the i(th) correlation value between the WAT parameter and the fabrication tool, n represents the total number of PSVs, and SS represents the average of all PSVs. For example, it is supposed that both a study wafer lot and a similar failed wafer lot are processed by the fabrication tool "NWL1 AIMNW1" 213c according to the same recipe. Referring again to FIG. 2, if the study lot fails parameter 224 and the similar failed wafer lot fails parameter 225, the SS values equals 4/1=4 calculated by equation (1).

Figure 3C:
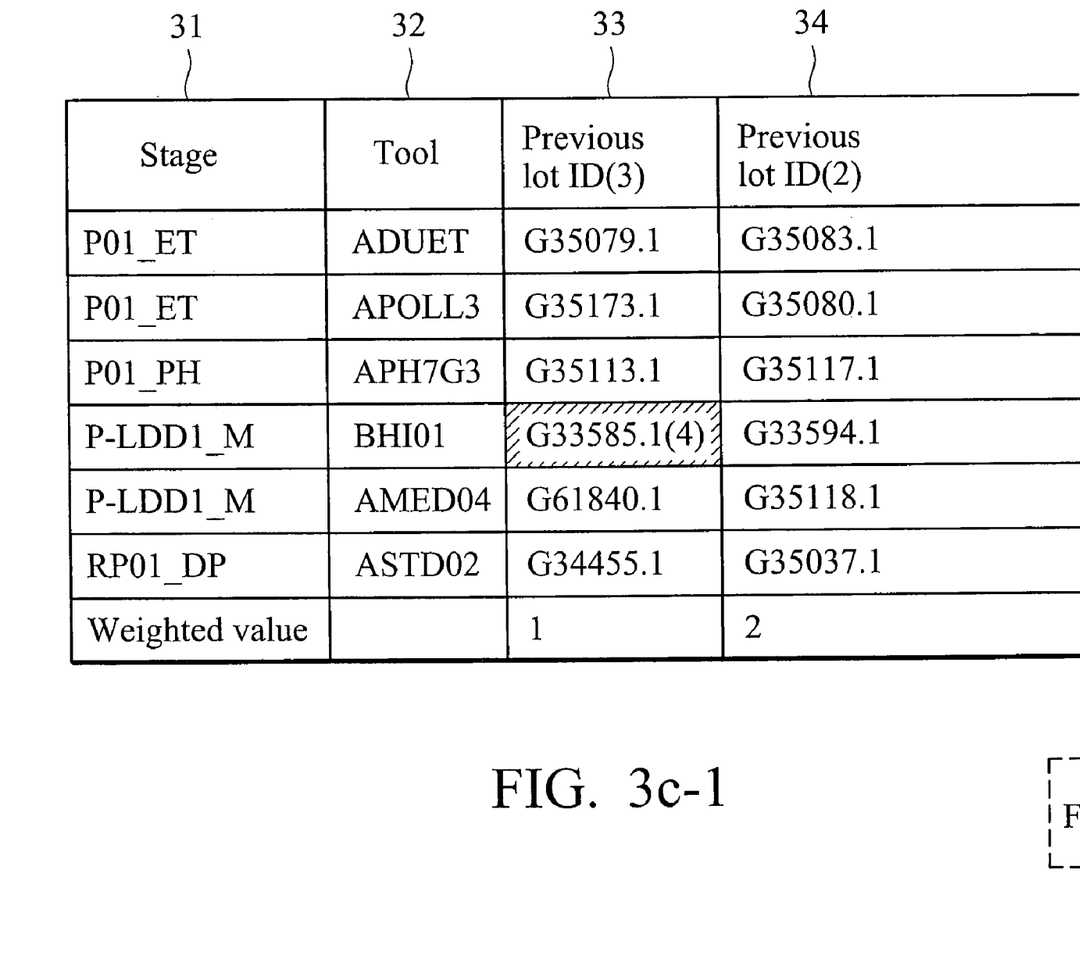
Figure 3C:
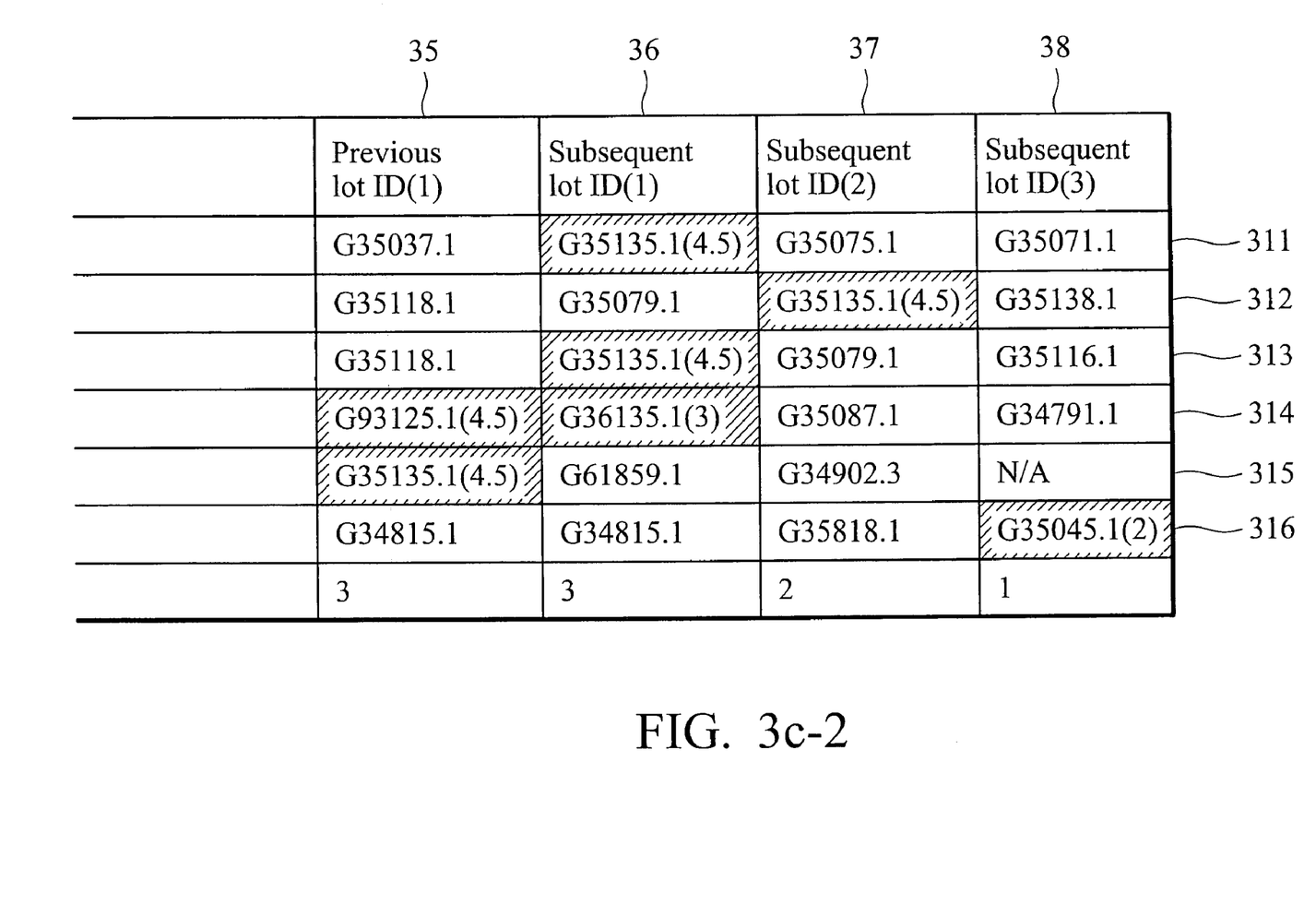

Equation (2):

$$SS = \frac{\sum_{i=1}^{n} PSVi}{n} * \alpha,$$

where PSVi represents the i(th) correlation value between the WAT parameter and the fabrication tool, n represents the total number of PSVs, a is a predetermined constant larger than 1, and SS represents the average of all PSVs multiplied by $\alpha$. For example, it is supposed that both a study wafer lot and a similar failed wafer lot are processed by the fabrication tool "NWL1 AIMNW1" 213c according to the same recipe, and $\alpha$ is set to 1.5. Referring back to FIG. 2, if the study wafer lot fails parameter 225 and the similar failed wafer lot fails parameter 225, the SS value equals (4/1)×1.5=6 calculated by equation (2). Alternatively, if the study wafer lot fails parameter 225 and the similar failed wafer lot fails both parameters 224 and 225, the SS value equals (3+4)/2× 1.5=5.25. Referring to FIGS. 3c-1 and 3c-2, similarity scores of similar failed wafer lots are bracketed as shown in the shadowed areas.

Step 426 determines whether all similar failed lot identities are complete, if so, the process proceeds to step S427; otherwise, the process proceeds to the start point of the inner loop, step S424, for the next SS calculation.

In step S427 a causal score (CS) is calculated to reflect the causality relationship between the fabrication issue and the study lot, and the stronger relationship has a higher value than the weaker relationship. In order to consider time lengths between similar lot identities and the study one, referring to FIGS. 3c-1 and 3c-2, multiple weighted values are predefined as shown in row 317. For each fabrication issue, adjacent similar failed wafer lots including the study lot (not shown) are referred to as a continuity fault pattern. For example, referring to row 314, a previous similar failed lot, a study lot and a subsequent similar failed lot form a continuity fault pattern, and its length is 3. Equation (3) shows the formula for calculating a causal score (CS).

Equation (3):

$$CS = (1-\beta) * \left( \sum_{i=1}^{n1} LENi - 1 \right) \Big/ (Wt/2)\wedge 2 + \beta * \sum_{j=1}^{n2} (SSj*(WSSt/Wt)*WSSj),$$

where $\beta$ is a predetermined constant between 0 and 1, n1 represents the total number of continuity failed patterns for the fabrication issue, n2 represents the total number of similar failed lots for the fabrication issue, LENi represents the length of the (i)th continuity failed pattern, Wt represents the sum of the weighted values, SSj represents the similar score of the (j)th similar failed lot identity, WSSt represents the sum of the weighted values of the similar failed lot identities, and WSSj represents the weighted value of the (j)th similar failed lot identity. For example, let $\beta$ equal 0.5. Referring to row 311 in FIG. 3c, the CS of "ADUET" equals 0.5*(1^2/36)+0.5*(4.5/3*3/12)=0.1924 calculated by equation (3). In addition, referring to row 314, the CS of "BHI01" equals 0.5*(2^2/36)+0.5*(4/7*1/12+4.5/7*3/12+3/7*3/12) =0.2073 calculated by equation (3).

Step 428 determines whether all fabrication issues are complete, if so, the process proceeds to step S431; otherwise, the process proceeds to the start point of the outer loop, step S421, for the next CS calculation.

Figure 3D:
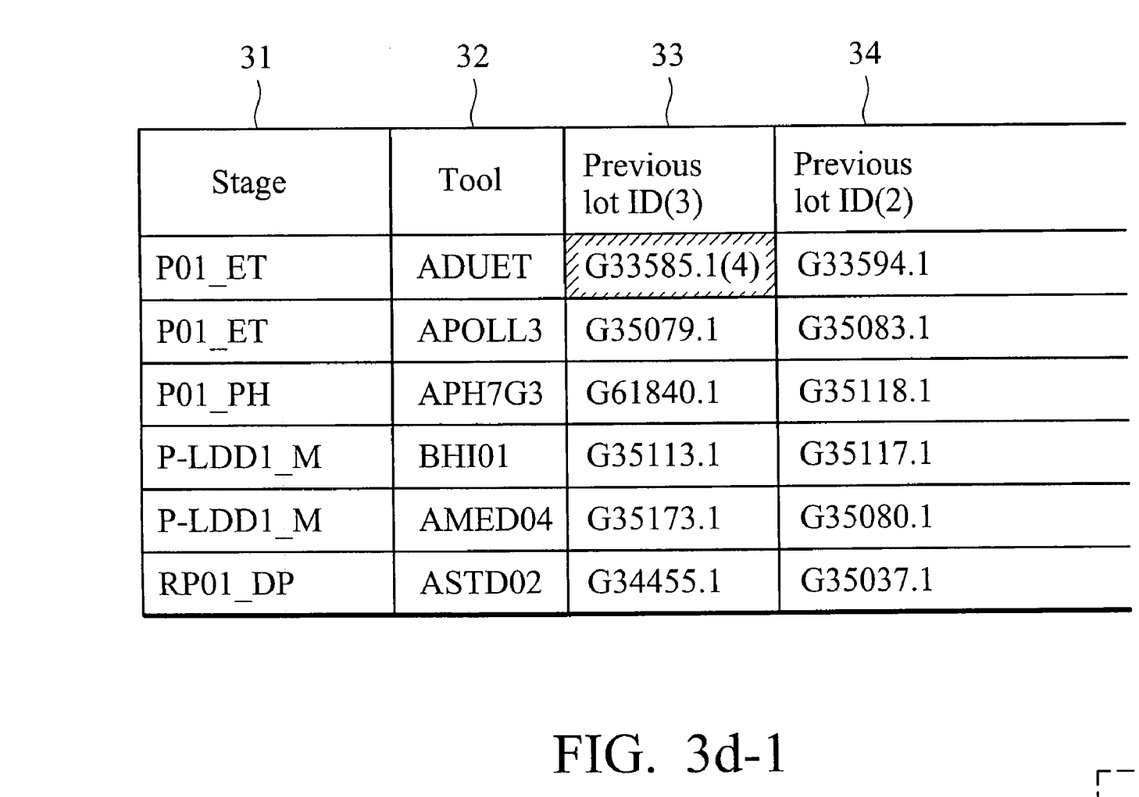
Figure 3D:
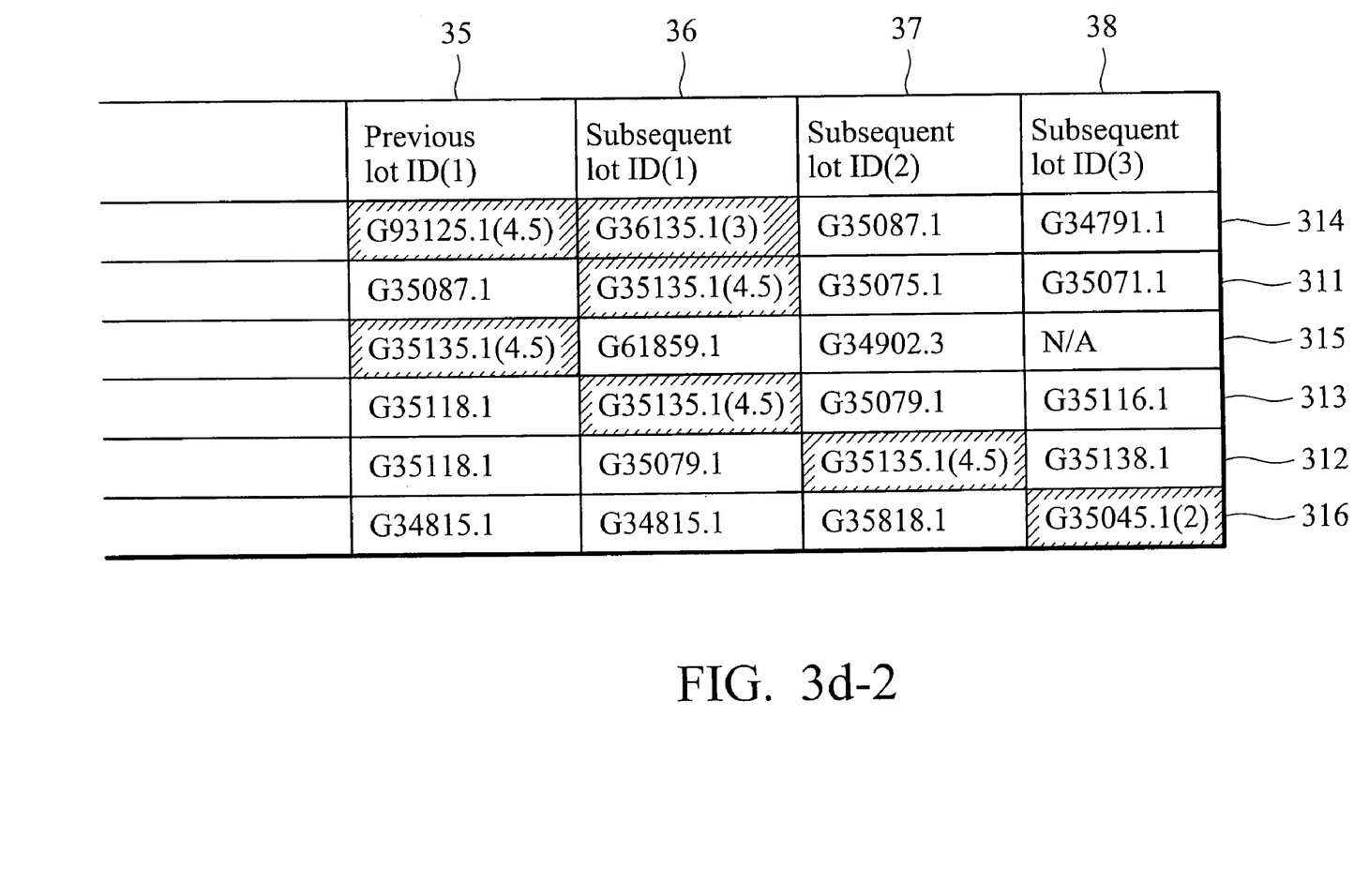

In step S431, fabrication issues are arranged in descending order according to their CS value. Referring to FIGS. 3d-1 and 3d-2, the fabrication issues which cause the failed study lot from the highest to the lowest possibilities are "BHI01", "ADUET", "AMED04", "APH7G3", "APOLL3" and "ASTD02".

Finally, in step S432, the ordered fabrication issues with requisite information are displayed on the display device 14 or are stored in the storage device 13.

Figure 5:
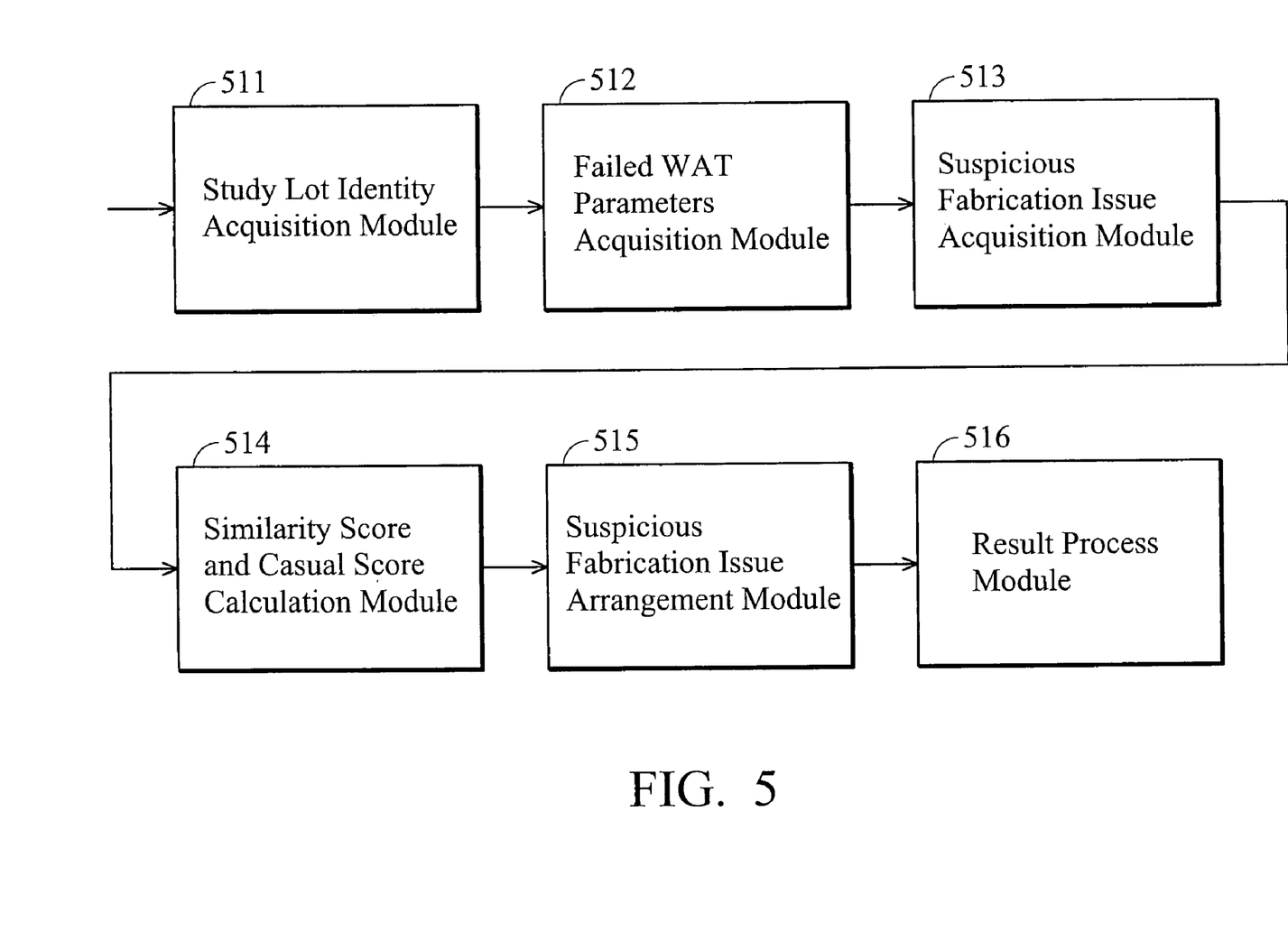
FIG. 5 is a schematic diagram of semiconductor fabrication fault analysis system.

FIG. 5 is a schematic diagram of semiconductor fabrication fault analysis system. The system 10 includes six modules, such as a study lot identity acquisition module 511, a failed WAT parameters acquisition module 512, a suspect fabrication issue acquisition module 513, a similarity score and causal score calculation module 514, a suspect fabrication issue arrangement module 515 and a result process module 516. Referring to FIGS. 4a and 4b, the study lot identity acquisition module 511 performs step S411, the failed WAT parameters acquisition module performs step S412, the suspect fabrication issue acquisition module 513 performs step S413, the similarity score and causal score calculation module 514 performs steps S421 to S428, the suspect fabrication issue arrangement module 515 performs step S431 and a result process module 516 performs step S432.

Figure 6:
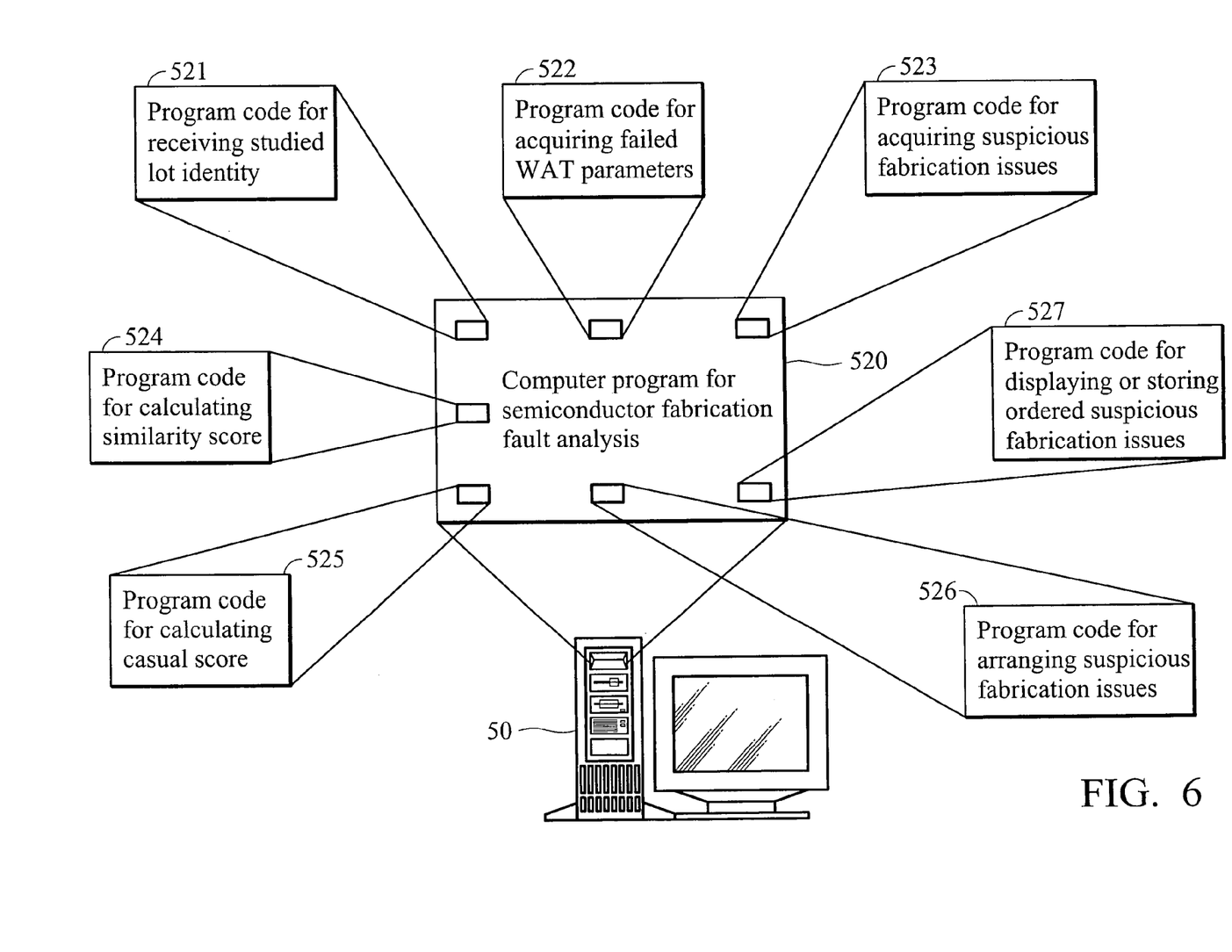
FIG. 6 is a diagram of a storage medium for storing a computer program providing the method for semiconductor fabrication fault analysis.

The disclosure teaches a storage medium for storing a computer program providing the disclosed method for semiconductor fabrication fault analysis, as shown in FIG. 6. The computer program product includes a storage medium 50 having computer readable program code embodied in the medium for use in a computer system, the computer readable program code comprising at least computer readable program code 521 for receiving a wafer lot identity as a study lot identity, computer readable program code 522 for acquiring failed WAT parameters corresponding to the study lot identity, computer readable program code 523 for acquiring fabrication issues corresponding to the failed WAT parameters, computer readable program code 524 for calculating a SS by performing the above inner loop, computer readable program code 525 for calculating a CS by performing the above outer loop, computer readable program code 526 for arranging the fabrication issues according to their CS values, and computer readable program code 527 for displaying or storing the ordered fabrication issues with requisite information.

The disclosed methods and system, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The disclosed methods and apparatus may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to specific logic circuits.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for semiconductor fabrication fault analysis, the method comprising the steps of:
   receiving a wafer lot identity as a study lot identity, the wafer lot identify having at least one corresponding test record;
   acquiring at least one suspect fabrication issue corresponding to the study lot identity;
   acquiring a number of comparative wafer lot identities which have been processed by the same fabrication tool and fabrication recipe as the study lot identity, each of the comparative wafer lot identities having at least one corresponding test record;
   comparing the test records of the study lot identity with the test records of the comparative wafer lot identities to identify comparative wafer lot identities having a failure relating to the suspect fabrication issue which is similar to a failure of the study lot identity;
   calculating a similarity score for each comparative wafer lot identity having the similar failure; and
   calculating a causal score according to the similarity scores of the comparative wafer lot identities having the similar failure for the suspect fabrication issue.

2. The method of claim 1, wherein the study lot identity is received from a user, a software application resident in the system, or a remote computer system via a computer network.

3. The method of claim 1, wherein the suspect fabrication issue comprises at least one selected from the group consisting of fabrication tools, fabrication recipes, and fabrication operations.

4. The method of claim 1, wherein the number of comparative lot identities prior to the study lot identity is not less than three.

5. The method of claim 1, wherein the number of comparative lot identities next to the study lot identity is not less than three.

6. The method of claim 1, further comprising a step of arranging the suspect fabrication issues according to causal scores thereof.

7. The method of claim 6, further comprising the step of displaying the ordered suspect fabrication issues on a display device.

8. The method of claim 6, further comprising the step of storing the ordered suspect fabrication issues in the storage device.

9. The method of claim 1, wherein the test record comprises a Wafer Acceptance Test (WAT) record.

10. The method of claim 1, wherein the suspect issue is acquired by querying a plurality of Quality Function Deployment (QFD) records and the test records, each QFD record storing information regarding a test parameter belonging to a cluster group and a plurality of correlation values between the test parameter and a plurality of fabrication issues, each test record storing test information regarding whether the wafer lot has failed the test parameters.

11. The method of claim 1, wherein the comparative lot identity is acquired by querying a plurality of lot processing records for each fabrication issue, each lot processing record storing fabrication information regarding a wafer lot which has been processed by a fabrication tool according to a fabrication recipe.

12. The method of claim 1, wherein the similarity score (SS) for the comparative wafer lot is calculated by a first equation if the comparative wafer lot identities corresponding to different failed test parameters from the study lot identity, the first equation being:

$$SS = \frac{\sum_{i=1}^{n} PSVi}{n},$$

PSVi representing the i(th) correlation value between the test parameter and the fabrication issue, and n representing a total number of PSVs.

13. The method of claim 12, wherein the similarity score (SS) for the comparative wafer lot is calculated by a second equation if the comparative wafer lot identities corresponding to any of the same test parameters as those found in the study lot, the second equation being:

$$SS = \frac{\sum_{i=1}^{n} PSVi}{n} * \alpha,$$

PSVi representing the i(th) correlation value between the test parameter and the fabrication issue, n representing a total number of PSVs, and $\alpha$ being a predetermined constant larger than 1.

14. The method of claim 13, wherein the causal score is calculated by a third equation:

$$CS = (1-\beta) * \left(\sum_{i=1}^{n1} LENi - 1\right) \Big/ (Wt/2) \wedge 2 + \beta * \sum_{j=1}^{n2} (SSj * (WSSt/Wt) * WSSj),$$

$\beta$ being a predetermined constant between 0 and 1, n1 representing a total number of continuity failed patterns for the fabrication issue, n2 representing a total number of similar failed lots for the fabrication issue, LENi representing a length of the (i)th continuity failed pattern, Wt representing the sum of all weighted values, SSj representing the similar score of the (j)th similar failed lot identity, WSSt representing the sum of the weighted values of the similar failed lot identities, and WSSj representing the weighted value of the (j)th similar failed lot identity.

15. The method of claim 1, wherein the causal score is calculated by equation:

$$CS = (1-\beta) * \left(\sum_{i=1}^{n1} LENi - 1\right) \Big/ (Wt/2) \wedge 2 + \beta * \sum_{j=1}^{n2} (SSj * (WSSt/Wt) * WSSj),$$

$\beta$ being a predetermined constant between 0 and 1, n1 representing a total number of continuity failed patterns for the fabrication issue, n2 representing a total number of similar failed lots for the fabrication issue, LENi representing a length of the (i)th continuity failed pattern, Wt representing the sum of all weighted values, SSj representing the similar score of the (j)th similar failed lot identity, WSSt representing the sum of the weighted values of the similar failed lot identities, and WSSj representing the weighted value of the (j)th similar failed lot identity.

16. A system for semiconductor fabrication fault analysis, comprising:
  a storage device, capable of storing a plurality of test records;
  a first module for receiving a wafer lot identity as a study lot identity having at least one corresponding test record;
  a second module for acquiring a plurality of suspect fabrication issues corresponding to the study lot identity; and
  a third module for acquiring a number of comparative wafer lot identities which have been processed by the same fabrication tool and fabrication recipe as the study lot identity, each of the comparative wafer lot identities having at least one corresponding test record, the third module further being for comparing the test records of the study lot identity with the test records of the comparative wafer lot identities to identify comparative wafer lot identities having a failure relating to the suspect fabrication issue which is similar to a failure of the study lot identity, the third module further being for calculating a similarity score for each comparative wafer lot identity having the similar failure, and calculating a causal score according to the similarity scores of the comparative wafer lot identities having the similar failure for the suspect fabrication issue.

17. The system of claim 16, wherein the study lot identity is received from one of:
  a user;
  a software application resident in the system; or
  a remote computer system via a computer network; or
  a combination thereof.

18. The system of claim 16, wherein the suspect fabrication issues comprise one of:
  fabrication tools;
  fabrication recipes;
  fabrication operations; or
  a combination thereof.

19. The system of claim 16, wherein the number of comparative lot identities prior to the study lot identity is not less than three.

20. The system of claim 16, wherein the number of comparative lot identities next to the study lot identity is not less than three.

21. The system of claim 16, further comprising a fourth module for arranging the suspect fabrication issues according to causal scores thereof.

22. The system of claim 21, wherein the ordered suspect fabrication issues are:
  displayed on a display device;
  stored in the storage device; or
  both.

23. The system of claim 21, further comprising means for displaying the ordered suspect fabrication issues.

24. The system of claim 16, wherein the test record comprises a Wafer Acceptance Test (WAT) record.

25. The system of claim 16, wherein the suspect issue is acquired by querying a plurality of Quality Function Deployment (QFD) records and the test records, each QFD record storing information regarding a test parameter belonging to a cluster group and a plurality of correlation values between the test parameter and a plurality of fabrication issues, each test record storing test information regarding whether the wafer lot has failed the test parameters.

26. The system of claim 16, wherein the comparative lot identity by querying a plurality of lot processing records for each fabrication issue, each lot processing record storing fabrication information regarding a wafer lot which has been processed by a fabrication tool according to a fabrication recipe.

27. The system of claim 16, wherein the similarity score (SS) for the comparative wafer lot is calculated by a first equation if the comparative wafer lot identities corresponding to different failed test parameters from the study lot identity, the first equation being:

$$SS = \frac{\sum_{i=1}^{n} PSVi}{n},$$

PSVi representing the i(th) correlation value between the test parameter and the fabrication issue, and n representing a total number of PSVs.

28. The system of claim 27, wherein the similarity score (SS) for the comparative wafer lot is calculated by a second equation if the comparative wafer lot identities corresponding to any of the same test parameters as those found in the study lot, the second equation being:

$$SS = \frac{\sum_{i=1}^{n} PSVi}{n} * \alpha,$$

PSVi representing the i(th) correlation value between the test parameter and the fabrication issue, n representing a total number of PSVs, and $\alpha$ being a predetermined constant larger than 1.

29. The system of claim 28, wherein the causal score is calculated by a third equation:

$$CS = (1-\beta)*\left(\sum_{i=1}^{n1} LENi - 1\right) \bigg/ (Wt/2) \wedge 2 + \beta * \sum_{j=1}^{n2} (SSj*(WSSt/Wt)*WSSj),$$

$\beta$ being a predetermined constant between 0 and 1, n1 representing a total number of continuity failed patterns for the fabrication issue, n2 representing a total number of similar failed lots for the fabrication issue, LENi representing a length of the (i)th continuity failed pattern, Wt representing the sum of all weighted values, SSj representing the similar score of the (j)th similar failed lot identity, WSSt representing the sum of the weighted values of the similar failed lot identities, and WSSj representing the weighted value of the (j)th similar failed lot identity.

30. The system of claim 16, wherein the causal score is calculated by a first equation:

$$CS = (1-\beta)*\left(\sum_{i=1}^{n1} LENi - 1\right) \bigg/ (Wt/2) \wedge 2 + \beta * \sum_{j=1}^{n2} (SSj*(WSSt/Wt)*WSSj),$$

$\beta$ being a predetermined constant between 0 and 1, n1 representing a total number of continuity failed patterns for the fabrication issue, n2 representing a total number of similar failed lots for the fabrication issue, LENi representing a length of the (i)th continuity failed pattern, Wt representing the sum of all weighted values, SSj representing the similar score of the (j)th similar failed lot identity, WSSt representing the sum of the weighted values of the similar failed lot identities, and WSSj representing the weighted value of the (j)th similar failed lot identity.

31. A machine-readable storage medium for storing a computer program which when executed performs a method of semiconductor fabrication fault analysis, the method comprising the steps of:
  receiving a wafer lot identity as a study lot identity, the wafer lot identify having at least one corresponding test record;
  acquiring at least one suspect fabrication issue corresponding to the study lot identity;
  acquiring a number of comparative wafer lot identities which have been processed by the same fabrication tool and fabrication recipe as the study lot identity, each of the comparative wafer lot identities having at least one corresponding test record;
  comparing the test records of the study lot identity with the test records of the comparative wafer lot identities to identify comparative wafer lot identities having a failure relating to the suspect fabrication issue which is similar to a failure of the study lot identity;
  calculating a similarity score for each comparative wafer lot identity having the similar failure; and
  calculating a causal score according to the similarity scores of the comparative wafer lot identities having the similar failure for the suspect fabrication issue.

32. The machine-readable storage medium of claim 31, wherein the study lot identity is received from one of:
  a user;
  a software application resident in the system;
  a remote computer system via a computer network; or
  a combination thereof.

33. The machine-readable storage medium of claim 31, wherein the suspect fabrication issues comprise:
  fabrication tools;
  fabrication recipes;
  fabrication operations; or
  a combination thereof.

34. The machine-readable storage medium of claim 31, wherein the number of comparative lot identities prior to the study lot identity is not less than three.

35. The machine-readable storage medium of claim 31, wherein the number of comparative lot identities next to the study lot identity is not less than three.

* * * * *